United States Patent [19]

Ace

[11] Patent Number: 4,781,452
[45] Date of Patent: Nov. 1, 1988

[54] MODULAR OPTICAL MANUFACTURING SYSTEM

[76] Inventor: Ronald S. Ace, 5200 J. Philadelphia Way, Lanham, Md. 20706

[21] Appl. No.: 669,168

[22] Filed: Nov. 7, 1984

[51] Int. Cl.⁴ .................. G02C 7/02; G02C 7/06; B24B 1/00; G06F 15/46
[52] U.S. Cl. .................. 351/177; 51/284 E; 351/170; 351/172; 351/175; 364/474.01; 364/474.06
[58] Field of Search ............. 351/168, 172, 175, 177; 364/474, 475; 51/284 E

[56] References Cited

U.S. PATENT DOCUMENTS

| | | | |
|---|---|---|---|
| Re. 31,247 | 5/1983 | Johnstone | 364/474 |
| 1,879,769 | 10/1930 | Silverman | 351/177 |
| 2,045,654 | 12/1934 | Hubbell | 351/170 |
| 2,049,095 | 3/1934 | Tillyer | 65/38 |
| 2,065,132 | 1/1933 | Hammon | 351/167 |
| 2,077,134 | 4/1934 | Tillyer | 351/173 |
| 2,177,021 | 10/1939 | Hammon | 351/170 |
| 2,177,022 | 5/1937 | Hammon | 65/38 |
| 2,187,105 | 1/1940 | Tillyer | 351/177 |
| 2,388,687 | 11/1945 | Hammon | 351/172 |
| 2,447,068 | 12/1942 | Hammon | 65/38 |
| 3,245,745 | 4/1966 | Hancock | 351/177 X |
| 3,760,169 | 9/1973 | Paculat | 235/151.1 |
| 3,857,025 | 12/1974 | English et al. | 235/151.11 |
| 3,877,798 | 4/1974 | Tolar et al. | 351/168 |
| 3,913,274 | 10/1975 | Raiford et al. | 51/284 |
| 4,007,559 | 2/1977 | Guillard | 51/101 LG |
| 4,063,390 | 12/1977 | Chevalier | 51/284 R |
| 4,096,684 | 7/1978 | Akaba et al. | 51/101 LG |
| 4,162,527 | 7/1979 | Kilbane et al. | 364/474 |
| 4,178,820 | 12/1979 | Gerber | 83/13 |
| 4,203,259 | 5/1980 | Haddock | 51/97 NC |
| 4,281,379 | 7/1981 | Austin | 364/102 |
| 4,327,615 | 5/1982 | Gerber et al. | 83/49 |
| 4,369,052 | 1/1983 | Hotmer | 65/160 |
| 4,391,170 | 7/1983 | Boverman et al. | 83/71 |
| 4,428,055 | 1/1984 | Kelley et al. | 364/474 |
| 4,645,317 | 2/1987 | Frieder et al. | 351/172 X |

Primary Examiner—John K. Corbin
Assistant Examiner—Scott J. Sugarman
Attorney, Agent, or Firm—Jones, Tullar & Cooper

[57] ABSTRACT

A method and apparatus for manufacturing prescription eyeglass lenses through the assembly of modular lens components is disclosed. The lens components include single-vision spherocylindrical stock lenses having positive or negative power, prism wedges which have no spherical or cylindrical power, bifocal or multifocal lens buttons, and slab-off prism wedges. These components may be assembled in accordance with data provided by a central computer to produce a desired prescription lens. The components are precisely aligned by means of an assembler, and are laminated by suitable adhesives.

16 Claims, 5 Drawing Sheets

STOCK (+) POWER SINGLE VISION
FIG.4 (PRIOR ART)

STOCK (+) POWER SINGLE VISION
FIG.5 (PRIOR ART)

PRISM WEDGE
FIG.6

MODULAR OPTICAL MANUFACTURING SYSTEM

BACKGROUND OF THE INVENTION

The present invention relates, in general, to the manufacture of prescription eyeglass lenses and, more particularly, to a unique method and apparatus for accurately and rapidly manufacturing such lenses to prescription through the assembly of modular components. The invention further relates to a method and apparatus for identifying and assembling component parts of a prescription lens and incorporates a method of edging lenses to fit selected frames for complete eyeglass manufacture.

For over 100 years, the ophthalmic lens manufacturing industry has remained static with eyeglass lenses being produced, using grinding and polishing technology that has been available for most of that period. Although some new lens materials have been introduced, such as plastics, and although a small percentage of prescription lenses can be cast with the finished optics, the vast majority of both glass and plastic lenses must still be ground and polished, one at a time. This process involves so many manufacturing steps that human error remains a large cost of doing business.

Many attempts have been made to modernize the ophthalmic lens industry, but the many failures are testimony to the fact that the production of quality eyeglass optics is far more complicated than is generally imagined. There are so many different prescriptions possible that most technological innovations simply do not take into account all of the possibilities, and thus are unacceptable.

One change that was made many years ago involved a shifting of the lens manufacturing and lens edging steps away from the retail optometrist to wholesale laboratories which are geared to large volume production of prescription lenses. This shift was based almost solely on ecomonics, since the cost of lens manufacturing equipment and inventory was so great that it was beyond the reach of most retail operations that wished to remain price-competitive. However, in giving up the manufacturing postion of the business, the retail lens dispenser also gave up many desirable features of his business, such as speed in meeting customer requirements and detailed product control. Problems in communication to and from the wholesaler, slow delivery times, the cost of double record keeping, the cost of double overhead and the inflexibility of a wholesale manufacturing operation were but a few of the problems created by this shift. The problems encountered by wholesale manufacturers in meeting the needs of the lens dispensers spurred the creation of "semi-finished" lens blank manufacturers who supplied semi-finished blanks to the wholesalers, creating yet another level of lost control and increased inventory variability. This additional level in the process of supplying lenses further compounded the problems noted above since such manufacturers proceeded to expand the availability of semifinished lens blanks, increasing the wholesalers inventory record keeping problems, and creating additional complexities and costs.

Eyeglass frame manufacturers contribute to the problems which exist in the industry since frame shapes and sizes are now dictated largely by fashion, and thus are subject to constant change. Since the frame geometry, or shape, always dictates the optical configuration of the prescription lens, such geometry is a critical variable that must be precisely defined before the lenses are produced. However, the huge number of frame shapes now available on the market cannot be managed efficiently by even the largest wholesale laboratories.

The present procedure for obtaining a pair of prescription eyeglasses requires that the patient first have his or her eyes examined and corrective lenses prescribed. An optician at the retail dispensary level helps the patient select a suitable frame that is compatible with the prescribed lenses and the distance between the patient's eyes is measured so that the distance between the major reference points of the lenses, when they are placed in the frames, will match the line of sight of the patient's eyes. The optical prescription as well as data relating to the style, size and shape of the frame is communicated to a wholesale laboratory where the lenses are to be manufactured. In a small portion of cases, the prescription can be produced from stock lenses often present at the dispenser's location, but most prescriptions must be surfaced from a blank. The prescription is verified by the wholesale laboratory and optical computations are made to select the proper lens blanks for the patient and for the selected frame so that the required frame shape can be "cut out" from the surfaced blanks. The lens blanks are then pulled from inventory and are mounted on blocks, or holders, which enable the blanks to be mounted in lens grinding and polishing equipment. A grinding and polishing tool, premanufactured to the compound curves required by the particular prescription, is selected from inventory. This tool holds the abrasive and polishing pads required to surface the lense through oscillation on the surface of the lens blank to contour the lens surface to the final compound curve geometry required by the prescription. A number of steps are required, using finer and finer abrasives, to produce the required high luster optical finish. This grinding and polishing process is ordinarily done so as to properly relocate the optical center of the lens from its geometric center to an offset location which corresponds to the patient's line of sight through the frame. This grinding to produce not only a prescription but decentration of the optical center requires complex calculations and is a significant source of error. Further, such grinding operation introduces distortions in the lens, which is often a source of customer dissatisfaction.

Once the lens has been polished, it is optically measured for correctness and then undergoes an edging process where the lens is geometrically edge-shaped to fit the frame selected by the patient. This requires an accurate location of the optical center of each lens of a pair with respect to the frame so that the resultant lenses, when mounted, will fit the patient. The completed spectacles are then optically and cosmetically inspected and shipped to the dispenser. The dispenser confirms the accuracy of the completed prescription and recalls the patient for fitting and delivery.

The normal process described above takes several days to complete, even if all of the necessary components are readily available at the laboratory. If a lens blank or particular frame is not available, additional delays—while the needed component is obtained from a manufacturer—are encountered. Because of the reciprocal relationship between a dispenser and a wholesale laboratory, there is a great redundancy in record keeping. Furthermore, the time required for this process is objectionable to everyone, particularly the patient, and all of the handling and record keeping required is costly and inconvenient. Furthermore, the potential for miscommunication is great and may result in conflict between the dispenser/retailer and the wholesaler, or between the dispenser/retailer and the patient, often leading to a loss of customers.

SUMMARY OF THE INVENTION

The present invention is directed to an apparatus and to a process for manufacturing prescription lenses which will eliminate incompatible retail-wholesale-patient relationships and which will enable prescription lenses to be manufactured, edge-shaped, fitted to a frame, and delivered to a patient, all at the dispenser/retail location and essentially while the patient waits. In accordance with the invention, a simple and rapid manufacturing procedure is provided which requires minimal capital investment for the dispenser and which avoids the problems of record keeping, communication, and multiple opportunities for human error that occurs in present systems for prescription lens and eyeglass manufacturing.

In accordance with the present invention, the entire manufacturing process is carried out at the dispensing location, which may be a retail store, where the patient is present and where all the information required for preparing the eyeglasses is readily available. The invention requires the availability at the dispensing location of some apparatus, which is normally already available at such locations, as well as some additional apparatus. Thus, there must be a selection of frames from which the patient can choose, and normally there will be an inventory of stock single vision lenses which would satisfy about 25% of the demand for prescriptions. Also required would be a lens edger for shaping the prescription optics to the shape of the frames selected by the patient. Such lens edgers are standard equipment in most retail locations.

In addition to the foregoing, a retail location taking advantage of the present invention would have an inventory of inexpensive modular lens components from which prescription lenses may be assembled in the manner to be described hereinbelow. In addition, a lens assembler, also to be described, would be required together with a computer terminal to allow communication with a central computer. Stored in the central computer is data which identifies which modular lens components would be required to construct a given prescription, plus frame pattern data corresponding to eyeglass frame shapes. Also located at the dispensing location is a pattern cutter which is responsive to information from the central computer to produce a frame pattern which corresponds to the geometry of the frame selected by the patient and which may be used in the lens edger to edge-shape the completed lens to fit the frame.

With the foregoing apparatus available, the process of manufacturing and fitting eyeglasses to a patient involves the usual measurements for the prescription and for the frame, including a measurement of the patient's pupilary distance to determine the location of the major reference points, or the optical center of the lenses with respect to the geometric centers of the frame openings in the selected frame. The information concerning the optical prescription, and the size, style, and manufacturer of the frame, is transmitted to a central computer. The computer then responds to transmit to the dispensing location instructions for assembling specific modular lens components to produce a lens with the required prescription and with the optical center, or major reference point of the lens, properly located for fitting the edge-finished lens into the selected frame. The central computer also provides instructions for producing a full-sized pattern shaped to fit the selected frame, which pattern is then automatically cut on the pattern cutter while the specified modular lens components are being assembled on the lens assembler device. Premanufactured modular lens components are selected at the dispensing location in accordance with the computer instructions and are laminated together to form the desired lens. The completed lens is then edge-shaped in the usual way in accordance with the pattern produced by the pattern cutter, the lenses are mounted in the frame selected by the patient, and the frame is fitted to the patient. All of this is done at the dispensing location and may be accomplished while the patient waits, thus avoiding the need for return visits by the patient.

The simplicity and desirability of the present invention is based on the discovery that an extremely large number of complex lenses can be constructed from a relatively small number of fundamental, modular components. These components serve as building blocks for producing, through modern lamination techniques, a wide variety of prescription lenses. The modular components fall into a small number of categories, the principal ones being:

(a) A simple, single-vision, sphero-cylindrical stock lenses which may have positive or negative power and which are normally carried by most wholesale laboratories and most dispenser/retail outlets;

(b) prism wedges which have no spherical or cylindrical power, but which may be combined with spherocylindrical stock lenses to induce controlled shifts of the optical centers thereof, or may be used to produce prescribed prism effects in prescription lenses;

(c) bifocal or multifocal components which always contain a net positive power and which may be attached to the surface of a lens to produce near vision, or "reading" improvement; and (d) "slab-off" prism wedges which are similar to (b) above, but which are only semicircular in shape. Such slab-off wedges may be used to correct the prismatic imbalance which occur when a patient wears eyeglasses having two lenses of greatly different power.

The foregoing optical modular components may be accurately and inexpensively produced by mass production machinery. Only a relatively small selection of optical values would be needed to provide virtually any required prescription lens; distant wholesale laboratory manufacturing would no longer be required.

The assembly of these modular components requires a precision assembler which would enable an operator to handle extremely thin and delicate modular optical parts and to accurately and precisely align them for lamination without damage. Such an assembler device would provide a calibrated positioning reticle for aligning the elements and would provide means for rotating the base single vision lens with respect to the prism wedge segment and with respect to any bifocal or trifocal segment so that the cylinder axes and optical centers can be properly positioned. The assembler would utilize delicate handling surfaces so that the modular components may be assembled without distortion and without damage to very fine lens edge portions. The assembler preferably would use delicate suction holders for manipulating the lens components and would incorporate an adhesive dispenser for application of an adhesive to the lens surfaces for lamination purposes. An ultraviolet light source would be provided to cure the u.v. curable adhesive only after the lens components are assembled in their proper relationship.

In summary, the eyeglass retailer is provided with, or obtains, the patient's optical prescription using standard optometric measurements. This prescription information includes both the optical prescription data as well as the eyeglass frame designation. This data is then entered into a local computer terminal where it is transmitted, as by telephone lines, to a large central computer. This data is simplified so as not to require special knowledge of optics. At the central computer, the data is used to call up specific instructions to be followed in assembling a lens from modular components, which instructions are transmitted back to the dispensing location. The equipment operator at the dispensing location then follows those instructions by placing the specified optical components into the assembler to produce the finished complex lens by laminating the components. Single vision, bifocal, or multifocal lenses may be produced in this manner without grinding or polishing facilities for surface finishing of lenses. The lens so produced will be of proper prescription and of sufficient diameter to fit the specified frame.

The central computer also produces data for cutting a frame pattern which corresponds exactly to the shape and size of the selected frame. The frame pattern is produced from an inexpensive blank at the dispensing location and is used in an edge grinder to shape the completed lens. This edging process can be done without the need to block each lens using complicated layout operations, which are prone to human error, and also avoids the need for maintaining a huge inventory of frame patterns. Once the lenses are edged, they can be inserted directly into the frame and delivered to the patient after auxiliary operations such as testing are carried out.

The lens manufacturing system of the present invention has numerous advantages over prior methods of manufacturing prescription lenses. Thus, almost any prescription can be constructed from a relatively few component parts and the assembly of lens components is done quickly and accurately at the dispensing location while the patient is present. The time involved in grinding and polishing lens surfaces, as well as the expensive and messy machinery, are completely eliminated, as are the numerous opportunities for error and product spoilage.

Although processes for laminating lenses are generally known, such prior processes have not recognized the simplicity of the present invention, which permits the optical center of a compound lens to be shifted from its geometric center just by adding a nonpower prism lens and which thereby enables a frame shape to be "cut out" of a smaller diameter lens blank without surface grinding or polishing, thus effecting significant cost savings.

The laminating process of the present invention also permits the use of thin coatings or films on the surfaces between the lens components so that such coatings or films are protected when the lens is assembled. The addition of Polaroid film, colored, or metal coatings, as well as the use of photochromic base single vision lenses, as desired, provide an extremely versatile lens system. Either glass or plastic lens components can be used and are chemically hardened before assembly to eliminate dispensing delays, to assure safety, and to meet federal lens hardness standards. Furthermore, the lenses produced by this sytem are not perceptively different from lenses produced with prior processes, and the finished product is optically and cosmetically the same as lenses made in accordance with prior conventional methods.

BRIEF DESCRIPTION OF THE DRAWINGS

The foregoing and additional objects, features and advantages of the present invention will become apparent from a more detailed consideration of preferred embodiments thereof taken in conjunction with the accompanying drawings in which.

DESCRIPTION OF PREFERRED EMBODIMENTS

Single vision lenses presently represent approximately 50% of all prescription lenses and are available in glass or in plastic. Of this 50% usage, about half, or 25% of the total prescriptions, may be obtained from what are commonly referred ( to as "stock single vision lenses". Stock lenses are those which have been pre-manufactured to standard, commonly used prescriptions by mass production grinding and polishing processes or by casting or molding processes, depending upon whether the material used is glass, in the first case, or plastic, in the latter case. These stock lenses are best characterized by the fact that they all have their optical center located at their geometric center. The optical center of a lens is that point on the lens where light will pass through with no deviation of its path; sometimes this is referred to as the major reference point.

A stock lens may have spherical power or cylindrical power, or both. The spherical power is determined by the difference between the front curvature and the back curvature of the lens. Cylinder power is produced by an additional curvature, usually ground onto the back surface of a lens in the form of a toroid. This curve is formed with its axis at right angles to the axis of the spherical curvature on that surface and is designed to correct for astigmatic problems in the wearer's eye. The cylinder axis is generally parallel to the plane of the lens and has an angular position which is defined in degrees of rotation about the major reference point of the lens. Compound lenses having sphero-cylindrical power are the most common, but an additional contour, referred to as prism, may also be prescribed and thus ground into the surface of a lens. Prism, in accordance with this invention, is an overall wedge-shape which is superimposed on the lens to shift the major reference point of the lens from the geometric center. Prism may also be prescribed to straighten the eyesight of a patient by deviating the line of sight through the lens.

A stock lens provided with spherical and cylindrical power is normally provided with its major reference point at its geometric center so that the optician may rotate the sphero-cylindrical lens about its optical center in order to position the cylinder axis correctly with respect to the frame in which it is to be mounted so that the prescription will be correct for the patient. Such stock lenses are available in several diameters, such as 60, 65, 70, 75 and even 80 mm. Because of the different curvatures of the spherical and cylindrical front and back surfaces of such lenses, the edge thickness of a lens increases tremendously as the diameter increases, with the result that the cost of stock lenses increases rapidly for each larger size. This is because the amount of material, labor, and the spoilage which results in making larger lenses progresses geometrically, making very large, high-diopter lenses undesirable not only economically but cosmetically.

Figure 1:
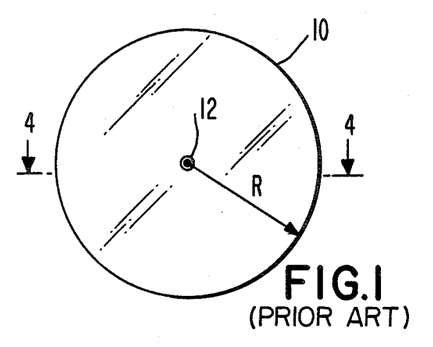
FIG. 1 is a plan view of a conventional single vision stock lens blank.
Figure 2:
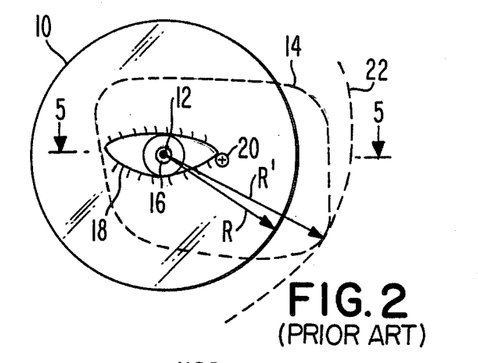
FIG. 2 is a diagrammatic illustration of the relationship of the optical center of a lens with respect to a frame.
Figure 3:
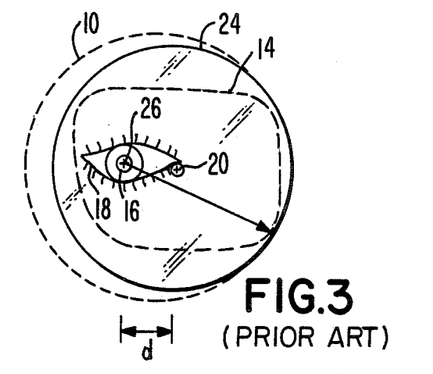
FIG. 3 is a diagrammatic illustration of the effect of decentration of the optical center of a lens.

Although lenses with the major reference point, or optical center, at the geometric center are in many respects convenient for the lens manufacturer and the lens wholesaler, a problem arises in trying to fit such lenses into standard frames, for the major reference point (M.R.P.) can almost never be located at the geometric center of a frame. This is because the M.R.P. of the lens must lie in front of pupils of the person wearing the eyeglasses and this location is not normally at the geometric center of the frame. Accordingly, if the M.R.P. of the lens is at its geometric center, then only a small part of a standard lens can actually be used in making the eyeglasses. This is not only wasteful but greatly increases the expense of the lens. This problem of waste is illustrated in FIGS. 1, 2 and 3, to which reference is now made. In FIG. 1, a circular single vision lens 10 is illustrated as having its major reference point 12 coinciding with its geometric center, at a distance R from the periphery of the lens. In order to fit this lens into a frame, the distance R must always be greater than the longest distance from the M.R.P. where the eye sees through the lens when the patient is wearing the eyeglasses, to the most distant edge of the chosen frame. If distance R is not equal to or greater than the distance from the pupil center to the most distant edge of the chosen frame, a lens that will fit in that frame will not "cut out" of the stock lens. This is illustrated in FIG. 2 where the outline of a selected frame is indicated at 14. The lens to be mounted in the frame must have its M.R.P 12 aligned with the center of the pupil 16 of the patient's eye 18 so that when the lens is mounted in the frame and the frame is being worn by the patient, the patient will look through the M.R.P when he looks straight ahead.

Since, however, the geometric center of the frame, illustrated at 20, does not normally lie over the center of the patient's pupil, the M.R.P. of the lens cannot be at the geometric center of the frame. Instead, the frame must be shifted with respect to the standard stock lens and a larger stock lens 22 must be selected which will have its M.R.P. located at 12 so that it will lie over the patient's pupil, and which will have a large enough radius $R^1$ to reach from the M.R.P. to the farthest radial point of the frame so that the frame will "cut out" of the lens. Accordingly, even though lens 10 has a diameter as large as that of the frame, it will not fit in that frame because of the need to locate the M.R.P. with respect to the patient's eye. For this reason, the larger, more costly lens 22 will have to be used in order to locate the M.R.P. properly. Since this stock lens is much larger than the frame, there will be a great deal of waste in edge grinding the lens to fit, as well as an increased expense in the lens itself.

An alternative to selecting a large, preground stock lens is illustrated in FIG. 3 to which reference is now made. In this case, the stock lens 10 is replaced by a semifinished lens blank 24 of the type which is conventionally provided to surfacing laboratories where prescriptions are made. The lens blank is finished on its front surface but is unfinished on its back surface and is ready for grinding and polishing to give it the final optical properties. The lens blank has its M.R.P. 20 at its geometric center, but in the grinding and polishing process, the M.R.P. 20 is decentered a distance D to a new reference point 26 located in alignment with the center of the pupil 16 of the eyeglass wearer. Although this grinding process allows the M.R.P. of the lens to be shifted the desired amount, so that the lens can now be "cut out" to fit the frame 14 with the M.R.P. located over the wearer's pupils, nevertheless this process is very labor intensive and requires careful and accurate computation in order to properly shift the M.R.P. so that the lens is wearable by the patient. This is costly and is prone to many errors and delays, and thus is not a wholly satisfactory method of manufacturing a prescription lens. However, this basic process is used for the majority of prescription lenses made in this country.

Figure 4:
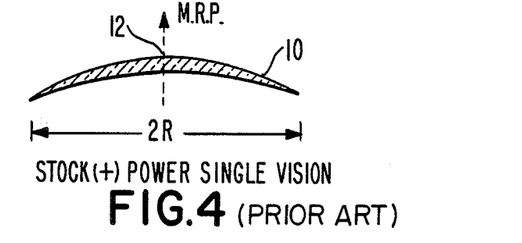
FIG. 4 is a cross-sectional view of the lens of FIG. 1 taken along line 4—4.

A stock positive power, single vision lens such as the lens 10 is illustrated in cross-section in FIG. 4, the section being taken along lines 4—4 of FIG. 1. As there shown, the lens is tapered at both edges and is thickest at the center where the M.R.P. 12 is located. The lens has a diameter 2R as shown and, for the reasons given above with respect to FIG. 2, this lens is not sufficiently large to accommodate the frame 14 when the M.R.P. is decentered to lie over the pupil of the wearer's eye.

Figure 5:
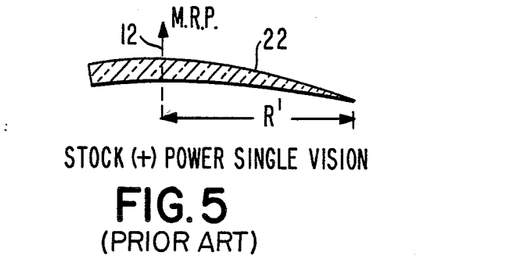
FIG. 5 is a cross-sectional view along line 5—5 of the lens of FIG. 2, after edge grinding to fit a frame.

As illustrated in FIG. 5, a larger lens 22 may be used to accommodate the frame 14 with the M.R.P 12 in the proper frame location with respect to the wearer's eye. It will be noted in FIG. 5, however, that this shifting the optical center of the lens away from the geometric center of the frame produces an unsymmetrical lens in cross-section, after edging, and this effect is referred to as "induced prism". A lens very similar in appearance to that of FIG. 5 is produced by surface grinding a lens blank, as discussed above with respect to FIG. 3, wherein the blank is ground and polished to decenter the M.R.P. a desired amount, depending upon the frame selected by the patient and the measured distance between the patient's eyes.

The induced prism effect illustrated in FIG. 5 is the basis of the present invention which permits any single vision prescription to be made from a stock single vision lens without the need for surface grinding and polishing and without the need for selecting oversized lenses to fit the frame. Thus, the present invention is directed to the method and apparatus for producing decentration of the M.R.P. of a lens through the use of a prism wedge adapted to be laminated to a conventional stock single vision prescription. The prism wedge, when properly applied, decenters the optical center, or major reference point, of the single vision lens, thereby allowing selection of a small diameter stock lens and avoiding the lost time, wasted material, and excessive cost of prior lens making procedures. Thus, the present invention permits the selection of a finished stock lens with the correct sphere and cylinder power in the smallest diameter that will fit the selected frame without regard to the location of the optical center of the lens within the frame. Decentration of the M.R.P of the selected lens is then attained by laminating to the front face of the stock lens a prism wedge in the manner illustrated in FIGS. 6, 7, and 8.

Figure 6:
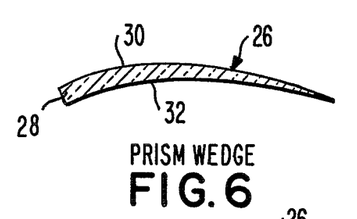
FIG. 6 illutrastes a cross-sectional view of a prism wedge lens.

A prism wedge is illustrated at 26 in FIG. 6 and comprises a glass or plastic body 28 having a front surface 30 and a rear, or inside surface 32. The curvature of the front surface is identical to the curvature of the back surface 32; that is, the curves of those surfaces have equal radii. This combination of identical curvatures always produces a zero spherical power and a zero cylindrical power lens. This configuration produces only prism power due to the fact that one side (the left hand side as viewed in the figure) is thicker than the other side. This difference is the "wedge" of the prism which dictates the amount of optical decentration possible when the prism is used with a single vision lens or the amount of prescribed prism induced into a base lens. The amount of prism is constant across the entire surface of the prism wedge 26.

Figure 7:
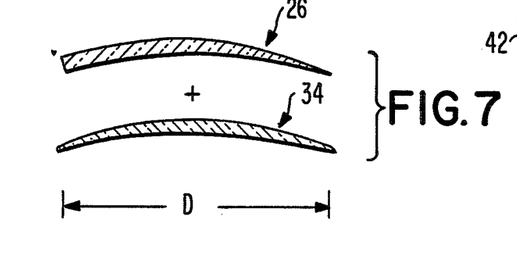
FIGS. 7 and 8 illustrate in cross-section the effect of laminating a stock positive power single vision lens and a prism wedge lens.

In FIG. 7, the combination of a prism wedge 26 and the smallest diameter stock lens 34, here illustrated as having a positive power, which will accommodate a selected frame are illustrated, the prism wedge and the stock lens having equal diameters D which are equal to or slightly greater than the maximum diameter of the selected frame. The two pieces, the prism wedge 26 and the stock lens 34, are laminated together in the manner illustrated in FIG. 8 after first rotating the cylinder axis of the stock lens to the proper angular orientation with respect to the patient's frame, in accordance with the patient's prescription. The prism wedge 26 is selected to have a thickness which will be sufficient to relocate the M.R.P. from its original location 36 on the stock lens to a new location 38 which is a distance d from the original M.R.P., as determined by the thickness of the selected prism wedge. This produces a compound lens 40 having its M.R.P. shifted in the direction of the base 42 of the wedge by an amount determined by the thickness of the prism wedge 26 and by the power of the stock lens 34.

Figure 9:
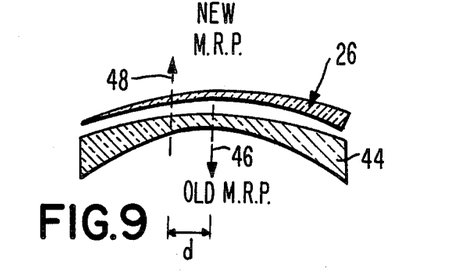
FIG. 9 illustrates in cross-section the effect of laminating a stock negative power single vision lens and a prism wedge lens.

In the case of a negative spherical stock lens 44 of the type illustrated in FIG. 9, the prism wedge 26 is still usable, but in this case it moves the M.R.P. in the opposite direction (that is, toward the thin portion or apex of the prism wedge instead of towards the base portion). Thus, the negative diopter stock lens 44 has its original M.R.P. 46 shifted a distance d to a new location indicated at 48, the distance of this shift depending upon the amount of prism in the wedge 26 and on the net negative power of the lens 44. Again, if there is any cylinder power in the stock lens 44, the axis of the cylinder must be properly oriented before the prism wedge is added to the lens. It will be understood that the prism wedge is oriented so as to shift the M.R.P. in the correct direction to locate the new M.R.P. at the required position in front of the pupil of the eyeglass wearer. If the prism wedge lens 26 has a larger diameter than the base lens 34 o 44 to which it is laminated, the lens components will be assembled so that the thickest part of the prism wedge overhangs the stock base lens, so that this excess can be trimmed away when the lens is edge ground. By trimming away the thickest part of the prism wedge, the finished lens will be kept as light in weight as possible and will be cosmetically attractive.

By forming the back surface 32 of the prism wedge and the front surfaces of all of the stock lenses to have the same radius of curvature, the prism wedge will exactly match any stock lens, and can be easily laminated thereto using conventional adhesives, as will be described. This allows a selection of standard single vision lenses to be combined with any of a plurality of standard prism wedges to shift the M.R.P. of the single vision lens any desired amount, so that the lens can be cut out for insertion in a selected frame. All that is required is that the proper single vision lens and prism wedge be selected, oriented, and laminated together to produce a lens that is ready for edge shaping and fitting into a frame without the need for surface polishing and grinding. This simple and quick process produces a finished lens product which is virtually indistinguishable from lenses made in accordance with the more complex and error prone procedures of the prior art.

Figure 8:
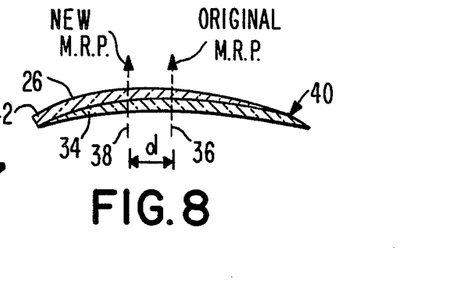

Although the illustrations of FIGS. 8 and 9 show simple lens configurations, it should be understood that the prism wedge of the present invention is adaptable to any prescription lens. Thus, for example, one common prescription calls for a stock lens having a positive sphere and a negative cylinder, wherein the cylinder power is greater than the spherical power. With such a prescription, the stock lens will appear to have a net plus power in one direction, a net minus power when measured at right angles to the first direction. This compound plus sphere and minus cylinder stock lens can be used with a prism wedge by first rotating the stock lens to the prescribed cylinder axis, as it would fit in the frame, and after that rotation is established, selecting a prism wedge that will relocate the major reference point in the correct direction. The prism wedge required for this is determined solely by the net power, plus or minus, of the stock lens in the desired direction of motion of the M.R.P. The prism wedge is simply rotated on the stock lens until the M.R.P. is moved in the correct direction by the correct amount.

The provision of stock lenses and prism wedges which can be combined with any selected stock lens to provide the correct optics for a prescription lens without the need for surface polishing and grinding may be referred to as a modular method for assembling prescription lenses, the selectable stock lenses and prism wedges being modular components in the finished lens. The assembly of such modules through a lamination technique will be described below in conjunction with apparatus for carrying out such an assembly.

Figures 10, 11A, 11B, 11C, 12:
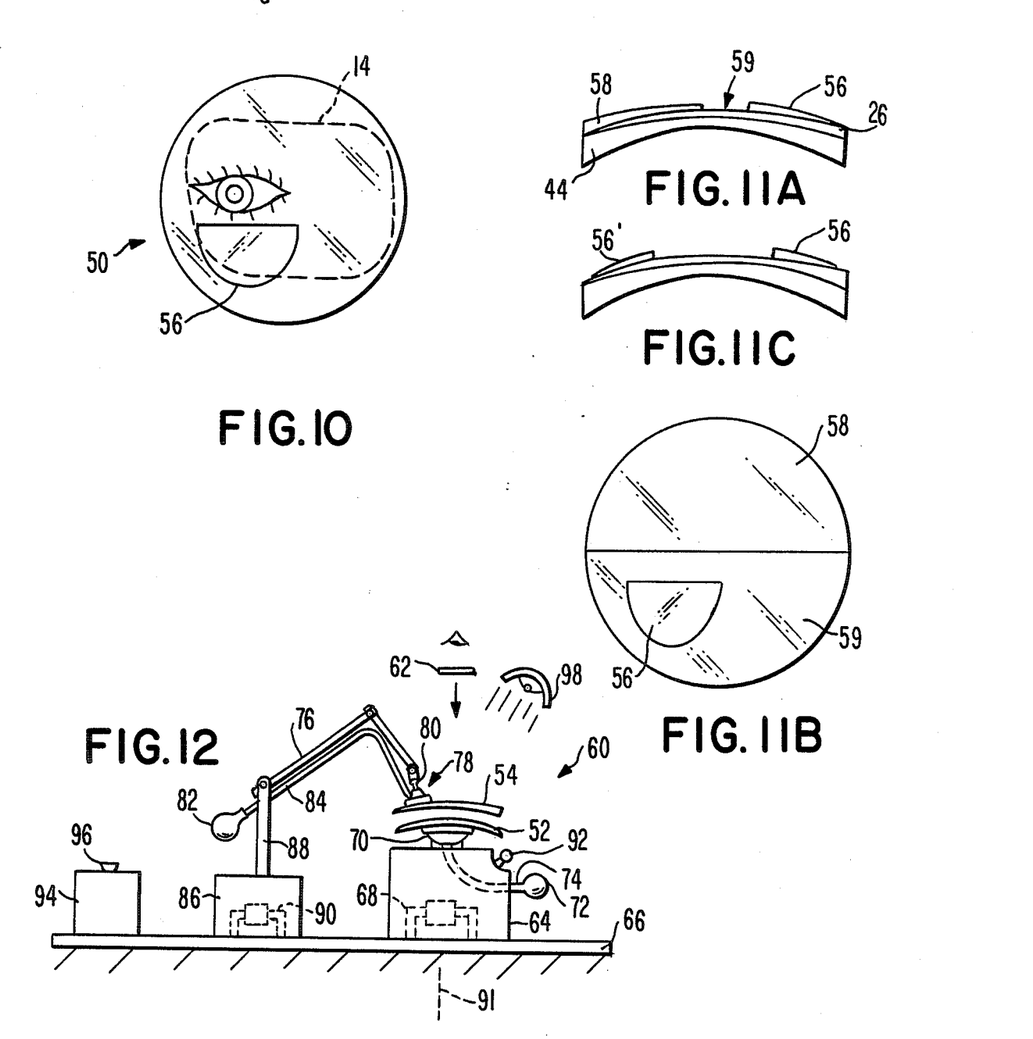
FIG. 10 illustrates a bifocal modular lens.
FIGS. 11, 11A, 11B, and 11C illustrate various trifocal modular lens arrangements.
FIG. 12 illustrates in diagrammatic form the side elevation of a lens assembler according to the present invention.
Figure 11:
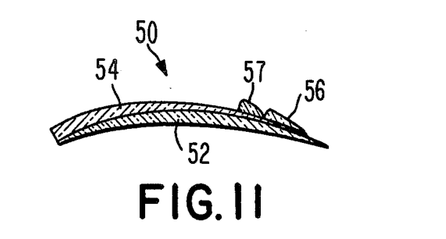

Although numerous advantages are derived from the lens structure and method outlined above, a major advantage of the present invention is its adaptability to the provision of additional modular components which allow the production of multifocal lenses. One of the main difficulties in producing multifocal lenses, such as bifocals or trifocals, is the location of the bifocal portion properly with respect to the M.R.P. of the main lens portion. The location of the correct line of sight for the bifocal or trifocal portion is different than the line of sight through the lens for far vision and, accordingly, the production of a multifocus lens under prior art systems has been extremely difficult and subject to many errors. However, the present invention avoids the problems of prior methods by providing segment buttons that can be laminated to the outside surface of the prism wedge device or directly to the surface of the stock base lens, if that lens is large enough to cut out. Thus, all that is necessary to produce a multifocal lens is to select a stock lens, orient it properly, laminate a prism wedge to its front surface to shift the M.R.P. to the required location and then laminate a multifocal segment button at the proper location on the front surface of the prism wedge. If the prism wedge is not required, the segment button is secured to the stock lens, with a resultant savings in cost. This is illustrated in FIGS. 10 and 11 wherein a multifocal lens 50 is illustrated as being constructed of a stock lens 52, an outer prism wedge 54, and a bifocal segment button 56. Although the button 56 is shown as being a small, flat-top lens, it will be understood that round bifocal buttons, blended round, or invisible buttons (where the bifocal edge is extremely thin and is, in effect, blended into the surface to which it is attached) and the so-called executive bifocal which extends across the entire width of the finished lens, all may be used with the present system.

A trifocal lens may be produced by simply laminating another bifocal segment button 57 onto the outer surface of the prism wedge at a desired location, as shown in FIG. 11. By proper selection of the surface curvatures, the modular components are interchangeable so that a lens of any desired characteristics can be produced for either a left lens or a right lens. This eliminates the need for lens blanks specific to left and right eyes and greatly reduces the required inventory.

In FIGS. 11A and 11B, further examples of trifocal lenses are illustrated. In FIG. 11A a negative power lens 44 and a prism wedge 26 are combined with a bifocal segment button 56 and a semicircular spherical power portion 58 which provides distance vision. The portion 59 of the lens between button 56 and portion 58 has a power intermediate to that of the distance vision and bifocal areas. By forming the distance vision portion with a flat bottom edge, the lens effectively becomes a "flat top executive style" trifocal lens, as seen more clearly in FIG. 11B. In FIG. 11C there is shown a lens having two near vision segments 56 and 56$^1$, one at the bottom of the lens in a conventional manner and the other at the top. This latter configuration enables the wearer to have near vision when looking either up or down; it is often called an "occupational" or "mailman" lens.

In order to construct a lens in accordance with the modular concept, the prism wedge must be available in about seven basic "base curve" configurations; that is, a complete set of prism values must be provided for each of about seven different radiuses of the outer and inner surfaces 30 and 32 (FIG. 6). Each of these sets of prism wedges must be available in about 20 discrete prism values, thus requiring an inventory of about 140 prism wedges to produce the vast majority of prescriptions. Extended ranges can also be produced for extreme prescription requirements, but these are relatively rare. It is possible to produce very thick prism wedges from the basic sets by stacking the available prism wedges, although this procedure should almost never be required. The prism wedge inventory may be used with already available stock lenses to enable a retail optician to assemble single vision and multifocal eyeglass lenses rapidly and accurately, without the need for surface grinding and polishing.

Although the foregoing description has been directed to the assembly of prism wedge lenses directly onto single vision lenses and the subsequent application of optional bifocal or trifocal segments, it will be apparent that a wide variety of optional lens treatments are also available. Thus, the lens components may be constructed from clear glass, photochromic glass, or with clear or photochromic glass using any solid or gradient tinting film within the lamination. In addition, or alternatively, a Polaroid layer may be interposed between the glass or plastic modular components and partially or fully mirrorized metal coatings may also be incorporated between the laminated layers of plastic or glass. Of course, the modular glass stock lenses preferably are chemically tempered prior to assembly of the lens to provide improved safety.

Since some of the modular lens components are thin and delicate, and in the case of the bifocal segments are quite small, and because the decentration of the M.R.P. is a highly critical operation that must be done exactly if the lens is to be usable, the present invention contemplated a modular lens assembler which facilitates the lamination of the lens components. Such an assembler is illustrated diagrammatically in FIG. 12. The assembler is generally indicated at 60 and includes apparatus for enabling individuals to handle the optical components without producing blemishes, as from fingerprints or other marks caused by handling the lenses, to prevent damage to the often razor-sharp edges, and further to facilitate accurate alignment of the component parts. Although the assembler may take many forms, it must incorporate several basic capabilities. First, it must include some form of calibrating device, such as a reticle or grid pattern, in an eye piece 62 which enables an operator to position the various elements, such as the stock lens 52, the prism wedge 54, and a suitable multifocal segment (not shown in FIG. 12). The stock lens element 52 is secured in position on a lens stage 64 which may be movably secured on a table 66. The lens stage may be secured by an electromagnet 68 which cooperates with a magnetic surface on table 66. The electromagnet is deenergized to allow the lens stage to be positioned in the desired location with respect to reticle 62 and is energized to hold it in the selected position. A work holder 70 is mounted on the top of lens stage 64 and preferably takes the form of a suction cup which is operable by means of a squeeze bulb 72 connected thereto by an air tube 74. The suction cup 70 preferably is constructed of a soft silicone rubber material which allows the lens element to be held firmly in place without significant distrortion. Because the lenses will in many cases be extremely thin and brittle, the provision of a center support is preferred.

The magnetic holder for the lens stage allows the stage 64 to be moved in any direction on the table top and to be rotatable around an axis passing through the center of the lens holder 70 to permit accurate positioning of the stock lens and to allow the axis of any cylindrical curvature to be properly oriented with respect to the prism wedge element which is to be bonded thereto.

The prism wedge 54 may be positioned on the stock lens 52 by means of an articulated support arm 76 which carries a vacuum chuck 78 in the form of a second suction cup. The cup is secured to arm 76 by means of a ball and socket swivel junction 80 which allows the prism wedge element 54 to be positioned accurately on the stock lens 52. A squeeze ball 82 is secured to arm 76 and is connected to suction cup 78 by means of a tube 84, whereby suction can be applied to cup 78 to hold the prism wedge 64. Preferably, the suction cup is formed from a soft silicone rubber material which is optically clear in the ultraviolet wavelength so that it will not interfere with the curing process of the adhesive which bonds the lens elements, to be described.

The articulated arm 76 is mounted on a work holder stage 86 by means of a mounting post 88. The work holder stage 86 is secured to the magnetic table 66 by means of an electromagnet 90 which may be deenergized to allow movement of stage 86 on the table top in any direction, to permit rotation of the stage about the axis 91 of lens stage 64, and then energized to secure it in the desired location.

If desired, a high intensity lamp 92 having no ultraviolet content may be provided, for example on the lens stage 64, to permit inspection of each lens module for optical defects and for blemishes, such as fingerprints, both prior to and after the assembly of the lens. The lamp 92 may produce 150,000 to 250,000 candle power which will make blemishes and defects very obvious.

Also mounted on the table 66 may be an adhesive dispenser 94 which provides a source of a suitable, degased adhesive for the lens modules before assembly. The adhesive may be dispensed as by small nozzle 96, or may be applied in any other convenient manner. After the adhesive is applied to the lens module and the lens is assembled, the adhesive is cured, as by ultraviolet light from a source 98.

The adhesive used to secure the modular elements together may be any adhesive which closely matches the optical index of the lens material and that can be made to cure rapidly, on demand only, to provide sufficient time for the individual assembling the lens components to locate them properly and to check the assembled components for optical accuracy. One example of such an adhesive is a modified acrylic ester which cures in only seconds upon exposure to ultraviolet light. Another acceptable adhesive is the clear cycloaliphatic epoxy resin made by Union Carbide which, when combined with a photo initiater, will also cure upon exposure to ultraviolet light. The viscosity of such adhesives is quite low so that bubble-free placement of the optical components is easily accomplished.

The problem of overflow of the adhesive as the components are placed in contact with each other is not serious if the ultraviolet light is timed to shut off prior to complete curing of the adhesive. At this time, the overflow may be wiped away with a nontoxic solvent, such as acetone, and the curing may then be completed. The problem is further simplified if adhesives are used which will cure only in the absence of oxygen upon the application of ultraviolet light. In that case, only the adhesive between the lens components will cure when exposed to ultraviolet light; the overflow will be exposed to oxygen and will not cure. This allows the entire lens to be laminated and cured; the overflow may simply be wiped away with solvent.

Through the use of the assembler 60 illustrated in FIG. 12, a stock lens 52 is placed on the lens stage and held gently but firmly in place by the suction cup 70. A suitable prism wedge 54 is selected and is picked up by the suction cup 78, a suitable adhesive is applied to its inside surface, and it is positioned on the stock lens 52. Lens 52 may be rotated, as by pivoting the lens stage 64, to properly align the lens components 52 and 54. When the individual operating the assembler 60 is satisfied that the M.R.P. of the stock lens has been decentered to the desired location, the adhesive may be cured in only seconds. Thereafter, a bifocal segment (or an additional "slab off" prism wedge, to be described) may be selected, an adhesive applied, and positioned on the modular lens held by suction cup 70. The position of the bifocal lens segment can be carefully measured by means of the reticle 62 so that it is properly located with respect to the major reference point of the lens. An additional bifocal segment, smaller than the first, can be added following the same sequence of steps if a trifocal lens is required. With this method of assembly, the lens can be continuously monitored and checked as it is being assembled, and before the adhesive is cured, so that errors are minimized.

To further reduce errors, the frame pattern, produced in the manner to be described below, may be superimposed on the operator's view of the lens being assembled so that the operator will be certain that the M.R.P., and the effective diameter of the lens, will be correct for the final insertion of the lens into the frame.

Upon completion of the lens assembly in assembler 60, the lens is edge ground to fit the frame selected by the patient. The frame outline 14 in FIG. 10 illustrates how the assembled lens must be shaped. This shaping is accomplished in a conventional edge shaper using a frame blank which preferably is produced in the manner described and claimed in co-pending application Ser. No. 669,167 filed Nov. 7, 1984 of Ronald S. Ace, and entitled "Method and Apparatus for Making Patterns for Eyeglasses" , now U.S. Pat. No. 4,656,590, the disclosure of which is incorporated wherein by reference.

As explained in that application, the shape and exact size of the frame pattern is obtained from a remote central computer at the time the patient selects the desired frame, and the frame pattern is produced locally, as by the lens dispenser, in a pattern cutter of the type described in the aforesaid co-pending application.

Figure 13:
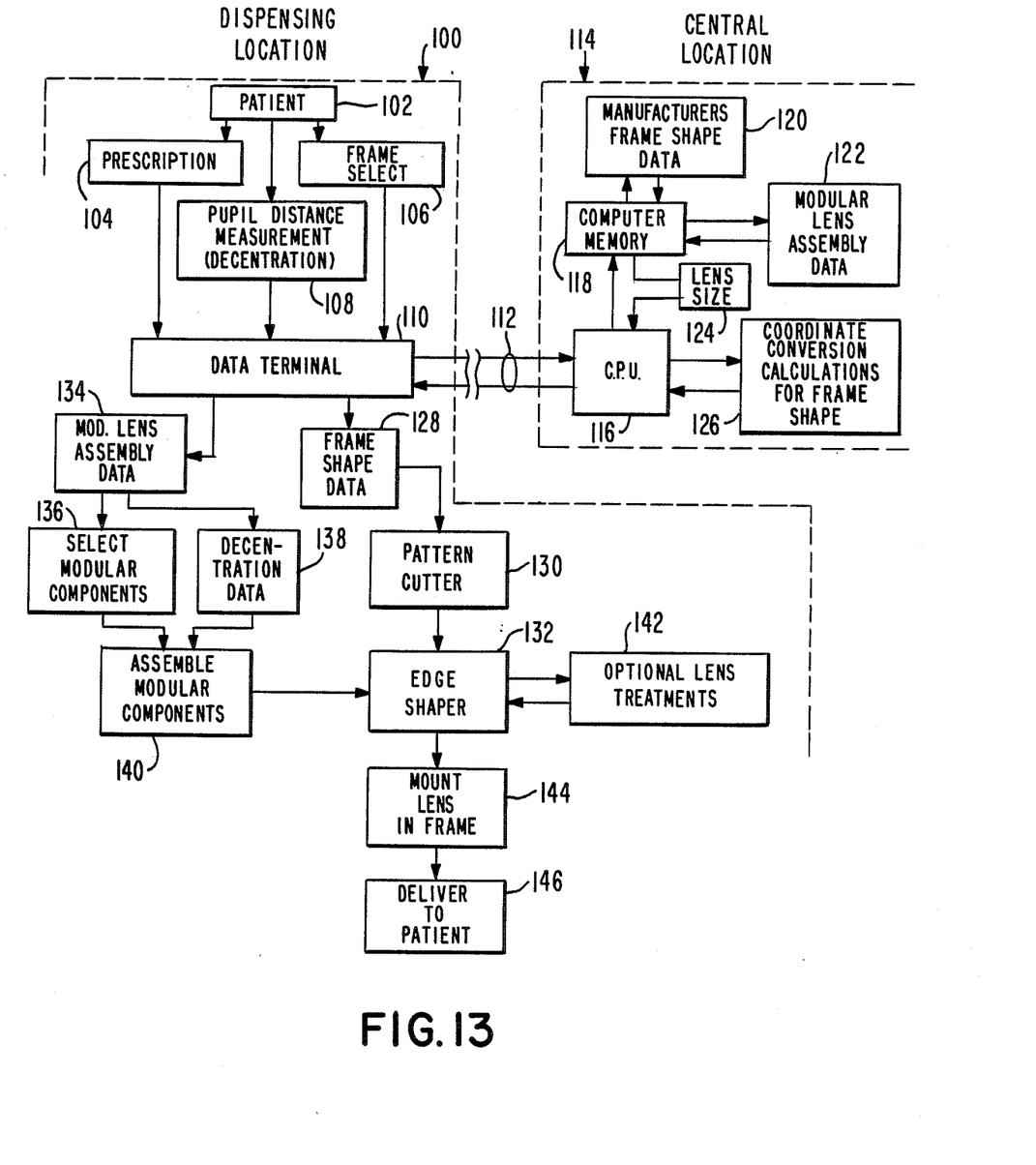
FIG. 13 is a flow diagram illustrating the present method of producing modular lenses.

The production of a frame pattern, the selection of proper modular components, and the assembly of a lens or pair of lenses, the cutting of a frame shape pattern and the edge grinding of the laminated modular lens assembly all constitute a part of the modular optical manufacturing method of the present invention, which is diagrammatically illustrated in FIG. 13, to which reference is now made. As shown, the present invention involves a lens manufacturing process which eliminates the usual lens wholesale manufacturer and provides apparatus which permits ( the lens dispenser to carry out the entire manufacturing process at the dispenser's location, in a relatively brief period of time, usually while the patient waits. This eliminates the "middle man" in the process, eliminates the need for the patient to return two or more times to the dispenser's location, and insures a simple, error free, and thus accurate filling of the patient's prescription.

The dispensing location may be, for example, any dispensing opthamologist, any dispensing optometrist, or any dispensing optician. It may be a retail store or a mobile unit, such as might be used by the armed forces for remote field locations or other governmental agencies, to service isolated individuals, immobilized patients, inmates in prisons, and the like. Such mobile units have not previously been successful because of the large lens blank inventory, huge machines, and large electrical power needs of prior systems. With the present invention, however, a mobile manufacturing/dispensing unit becomes a real possibility because of the significant reduction in size, weight, and power requirements now provided.

The dispensing location is generally indicated in FIG. 13 at 100 by the dotted outline and, as illustrated, involves direct contact with the patient 102 who either brings in a prescription that is to be filled or, if the dispensing location is that of a dispensing opthamologist or optometrist, has his eyes examined, and corrective lenses prescribed, as indicated at 104. Also at the dispensing location, the patient selects a frame, at 106, and the dispenser fits the frame to the patient and measures the pupillary distance (the distance between the patient's pupils) at 108, to obtain a measure of the required decentration for the lenses which are to be incorporated in the selected frame.

In accordance with the present invention, the information concerning the optical prescription, the frame, and the pupillary distance measurements are entered into a data terminal 110 which transmits this information over lines 112 to a central computer location indicated by the dotted outline 114. This central location is one of the keys to the present invention, for here is located all of the information required by a multitude of dispensing locations for constructing lenses from modular components and for fitting those lenses into the selected frames. As pointed out in the aforesaid copending application, Ser. No. 669,167 of Ronald S. Ace, now U.S. Pat. No. 4,656,590, there are literally thousands of frame styles and sizes made available by various frame manufacturers, with each frame style and each size in each style requiring a lens of a different shape, and further requiring special lens design considerations, such as the location of the optical center. Although the frame manufacturers do provide frame patterns for use in edge shaping a lens to fit a particular frame, the large number of patterns that are required to support an inventory of frames creates a record keeping and storage task that is beyond the capabilities of most dispensing locations. In accordance with the present invention, however, all of that frame pattern shape information is stored, maintained, and kept up to date at one central location 114 where it is then made available to all dispensing locations, as required, quickly, reliably, and inexpensively.

The central location 114 includes a central processing unit 116 which receives the prescription and frame data from terminal 110 and optionally may receive pupillary distance information as well. In accordance with that information, terminal 110 selects from its memory 118 the required frame shape data 120 and the modular lens assembly data 122. The lens assembly data is derived from the prescription 104 and, if supplied, from the decentration 108 information, and selects the best stock lens and prism wedge components, together with the orientation of the stock lens with respect to the prism wedge required to obtain the decentration needed for the particular patient. Alternatively, the decentration data can be provided at the dispenser location as explained below. The frame shape data 120 which is obtained from the frame manufacturer and the modular lens assembly data 122, determined in accordance with the present invention, are used to calculate at 124 the smallest possible lens size selected by the patient, and all of this information is then supplied to the central processing unit 116.

Normally, a manufacturer's frame shape data is based on a measurement of the frame, using its geometric center as the axis for the peripheral shape coordinates. However, the major reference point of a lens is the point where the patient looks through the lens and that is not normally at the geometric center of the lens. Therefore, the polar coordinates which define a frame pattern as provided by a frame manufacturer have a different polar axis than the convenient major reference point axis of a lens. This difference in axes makes difficult the direct edging of a lens to the pattern of a frame and requires that one or the other of the lens or pattern axes be shifted for the edge grinding process. This is conveniently accomplished at the central location 114 by means of a coordinate converter 126 which shifts the polar coordinate axis of the frame shape data to coincide with the major reference point of the completed lens assembly (i.e., after the decentration of the lens has been completed). The major reference point, or optical center, of the lens can then easily be used as the lens blocking point during the modular lens assembly process and that point will match the center of rotation of the frame pattern which is produced in the manner described in the aforesaid co-pending patent application. The resulting common axes of rotation not only facilitate the edging operation by eliminating all lens lay-out operations, but also provide more accurate patterns to ensure proper lens fitting to the frame. Since the pattern is always the exact size of the actual frame, the operator can insert the pattern into the frame before edge grinding the lens to ensure error-free operation.

The polar coordinates for the frame shape, as converted to match the decentered major reference point of the lens, are returned by the central processor unit 116 by way of lines 112 to the data terminal 110 and are stored in the frame shape data location 128 which preferrably is at the pattern cutter 130. If desired, the coordinate conversion calculations may be carried out at the dispensing location 100 in which case decentration data is not needed at the central location 114. Upon receipt of the frame shape data, the pattern cutter proceeds to cut a pattern which is identical in size and shape to the lens opening of the frame selected by the patient. Upon completion of the pattern, it is matched with the frame to make sure that it is correct and is then supplied to the edger machine 132, along with the completed prescription lenses.

The central processing unit 116 also returns to the data terminal 110 the modular lens assembly data which is delivered to location 134, which may be a data storage buffer, for example. This data then provides specific instruction to the operator through a suitable printout or terminal display at the dispensing location concerning which stock lens 52 to select, which prism wedge 54 (if any) to select from the stock, and which multifocal segments 56 and 58 (if any) to select, as indicated at 136. The data further provides instructions at 138 again by way of a printout or visible display concerning the angular relationship between the stock lens 52 and the prism wedge 54 to obtain the exact decentration required. This information is then used to assemble the modular components at 140 to produce the smallest possible lens that will cut out the shape of the selected frame and which will provide the major reference points for the lens in the proper location within the frame so that it is aligned with the pupil of the patient's eye.

The assembled modular lens, which may be bonded through the use of the apparatus of FIG. 12, is then supplied to the edger 132 which uses the pattern from pattern cutter 130 to edge shape the lens to an exact fit with the selected frame 106. Upon completion of the edging and comparison of the completed lens with the frame, optional lens treatments may be carried out, such as drilling, edge polishing, or the like at 142, and thereafter the completed lens is mounted in the frame at 144 and delivered to the patient at 146.

The use of a data terminal to obtain the necessary frame shape data and modular lens assembly data from a central location permits assembly of the lens and cutting it to shape at the dispensing location. The central processing unit provides the necessary information virtually immediately so that there is little delay in obtaining the required information and the lens dispenser can proceed to assemble the lens, shape it and mount in in the frame while the patient waits. Because the provided information is specific and can be checked by the dispenser during the assembly process and before edge shaping is done, errors and the resultant spoilage of lenses is virtually eliminated.

The present invention thus permits a simple, fast, economical and accurate assembly of single vision lenses or any type of multifocal lenses with a minimum of components, requiring minimal storage and inventory at the dispensing location while still permitting the rapid provision of virtually any prescription lens. In addition to the standard single vision lenses which lens dispensers normally carry at the present time, only about 140 different prism wedges ar required and about 20 powers for each base curve of each bifocal type (i.e., flat top, round, blended round, executive, and the like). This low number of modular components is made possible, in part, by the fact that components for the left eye and the right eye are interchangeable, since the multifocal segments are assembled at the desired location after the main body of the lens has been formed. Thus, for all prescriptions of one style of bifocal lens, 280 component parts, plus the usual stock lens inventory, is all that is required to produce all of the required prescriptions. If desired, the system can be expanded to permit the manufacture of cataract lenses, "slab off" specialties, quadruple multifocals, and the like, using the same principles discussed above.

Whenever a patient requires eyeglasses with widely different prescriptions in the distance portions of the two lenses, the patient will experience a prism imbalance when the direction of his vision deviates from the major reference points of the two lenses. This is caused by the unequal induced prism in the widely different lens powers and appears as a depth perception problem which is a function of the viewing angle through the two lenses. About 4–5% of all prescriptions produce prism imbalance between the eyes of the patient. Such a prism imbalance may be corrected by a "slab-off" lens for at least one of the patient's eyes. However, the cost to produce such a lens is about $50 to $75 over the normal $8.00 cost of a lens and this expense, together with the length of time required to make such a lens, and the fact that the problem is so little understood, means that most patients suffer with the problem, and don't even know that it could be corrected.

Figure 14:
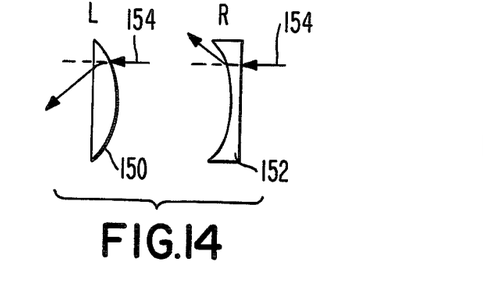
FIGS. 14–19 illustrate "slab-off" prisms and prism wedges.

An example of the slab-off problem is illustrated in FIG. 14, wherein a pair of lenses 150 and 152, the first being, for example, a simple spherical lens having a power of +5 diopters for the left eye, and the second being, for example, a simple spherical lens having a power of −5 diopters. As illustrated, light 154 from an image (not shown) is differently refracted in each lens, so that the light appears to the patient (whose eyes are to the left side of each lens as viewed in the figure) to be coming from different directions. This creates a serious visual problem for the patient.

Figure 15:
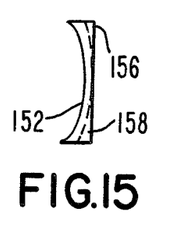
Figure 16:
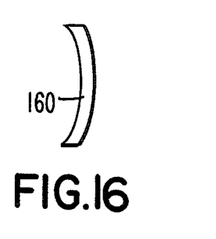

To alleviate this problem, prism is induced in the lens which has the most negative power; in this case that would be the right lens 152. This is accomplished in the manner illustrated in FIG. 15 for lens 152 by removing the prism-shaped segments 156 and 158, indicated by dotted lines, to produce the lens 160 illustrated in FIG. 16. The amount of prism provided is equal to about one-half the absolute power difference between the two lenses. Thus, if the total difference between the two lenses is 10 diopters, as in this example, the lens 152 would be surface ground on the outer surface of the lens to produce about 5 diopters of prism on both the upper half and the lower half of the lens.

Figures 17, 18:
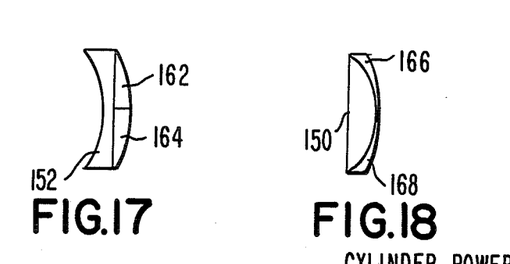

The prism wedges of the present invention can be used to provide slab-off prisms, but if they were used in accordance with prior practice and were added to the most negative of the pair of lenses, the result would be that shown in FIG. 17. Thus, prism wedges 162 and 164 would be added to the outer surface of lens 152. This would be cosmetically unacceptable because of the increased thickness of the lens and the line across the center of the lens. On the other hand, the same balancing effect between the left and right lenses can be obtained by adding a pair of the prism wedges 166 and 168 of the present invention to the positive power lens 150, as illustrated in FIG. 18. In this case the positive power lens has not been thickened at the center, nor is there a visible seam across the middle of the lens.

Figure 19:
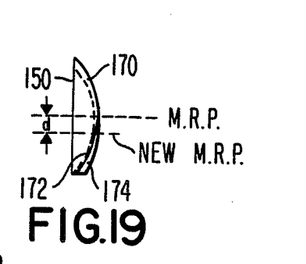

Instead of using two prism wedges, the same effect can be produced by decentering the (+) lens 150 and shifting the MRP a distance d as illustrated in FIG. 19. The new MRP, or optical center of the lens, has the effect of inducing a prism power 170 in the upper half of the lens 150. A slight amount of prism may also be induced in the lower half of the lens, as shown at 172. But this may be overcome by a single slab-off prism wedge 174 added at the lower half of the lens. This produces a lens which overcomes the conventional slab-off problem in a simple inexpensive manner.

The slab-off prism wedges, such as wedge 174, are essentially the same as the prism wedges 26 described hereinabove, except that wedges 26 are circular, and wedges 174 are semi-circular. This latter shape is all that is required, since only one-half of the base lens is to be covered by a slab-off prism wedge.

About 70 different component wedges of different powers and curvatures are required for slab-off use, and from these components almost every slab-off prescription could be satisfied for a relatively low cost. The need for a prism wedge in a pair of lenses can be determined in the central computer 116 (FIG. 13) of the present system, and the specific prism wedge component required can be included with the lens assembly data for use by the lens dispenser in producing the lenses for the patient.

Figure 20:
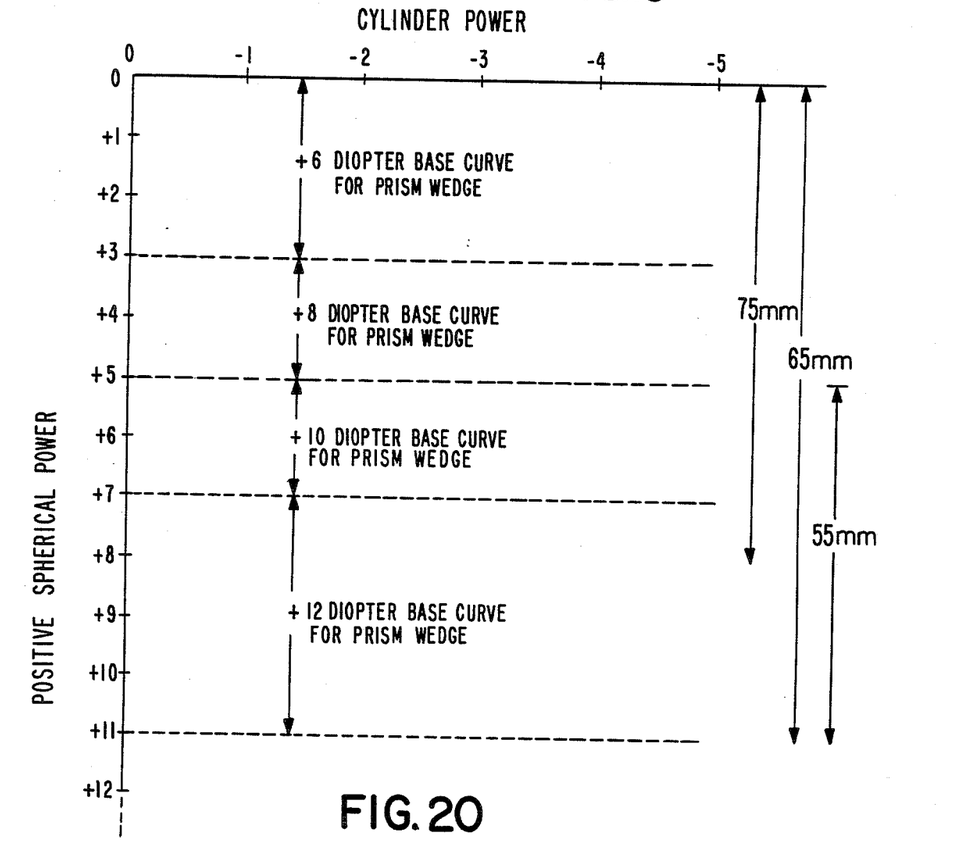
FIGS. 20 and 21 are tables illustrating an inventory of modular components for use in the present invention.
Figure 21:
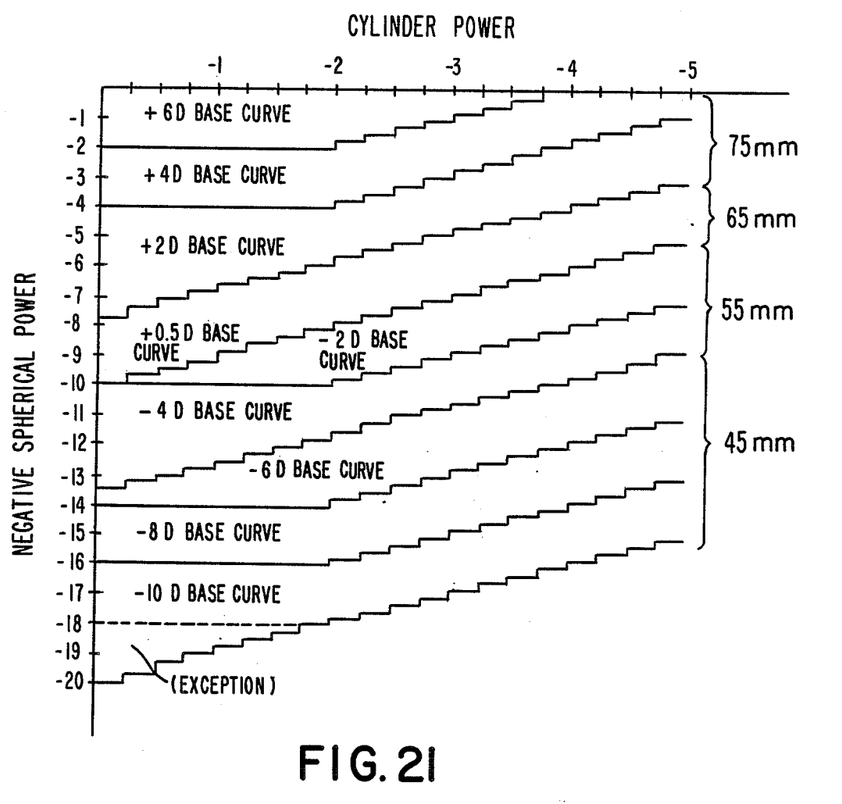

To illustrate the capabilities of the present invention, an inventory of modular lens components for carrying out the present invention might include the components illustrated on the table of FIGS. 20 and 21. These tables represent the stock compound single vision lenses that would normally be required for meeting the optical prescription requirements usually encountered by a lens dispenser. The positive power lenses in the table of FIG. 20 which are lenses of the type illustrated in FIG. 4, would be circular, with an edge thickness between 1.0 and 1.9 mm (1.8 mm nominal) with the optical center, or major reference point, at the geometrical center. The center thickness of the lenses would be less than 15 mm, for cosmetic purposes, and the inside, or occular, compound surface curvatures would range between −3 diopter and −9 diopter to conform to the translational arc of the human eye, although exceptions to this range and maximun thickness may be found in extreme cases. The spherical power of the lenses would range from 0 to +12 diopters, and the cylindrical power would range from 0 to −5 diopters.

The prism wedges used for these positive compound power lenses must have inner (occular) surface curvatures which match exactly the outer base curve surface curvatures of the stock single vision positive power compound lenses in order to provide interchangeability of components and accurate lamination. Thus, as shown on the table of FIG. 20, prism wedges having base curves of +6, +8, +10 and +12 diopters are required. These prism wedges would be supplied in 20 different prism values, in 0.25 diopter increments.

As shown in FIG. 20, the stock positive power lenses are supplied in a variety of standard diameters, namely 55 mm, 65 mm and 75 mm. Other diameters may be supplied in an expanded inventory, but the indicated diameters are sufficient for a majority of optical prescriptions.

The inside (occular) base curves of the negative compound power lenses should not exceed a range of −4 diopters to −8 diopters to conform the inner surface of the lenses to the natural translational arc of the eye. This inner surface diopter range is maintained by choosing front surface base curves having the values shown in FIG. 21, ranging from +6 diopters to −10 diopters (except in a small segment of the extremely high high −20 diopter range). The front surfaces receive the prism wedges of the present invention, as shown in FIG. 9, and thus a supply of prism wedges having a base curve range of +6D, to −10D is required. However, since the +2D, +4D, +6D, +8D and +10D base curve prism wedges can be reversed for use as −2D, −4D, −6D, −8D and =10D base curve prism wedges, the total number of wedges required in an inventory is accordingly reduced.

An inventory of negative compound power lenses will include lenses having 0 diopter to −20 diopter in 0.25 diopter steps, and will have cylindrical power between 0 diopter and −5 diopter in 0.25 diopter steps, as shown in FIG. 21. This provides 81 spherical and 21 cylindrical steps, but since some steps in the high ranges are not normally required, many of these combinations can be omitted.

From these charts, typical inventory of approximately 1340 negative compound power lenses in the four lens diameters indicated and approximately 1740 positive compound power lenses in the three lens diameters indicated would cover with just 3020 stock lenses the large majority of optical prescriptions, and would cover an unusually large range. These stock single vision lenses will be in 12 base curves, ranging from −10D to +12D, but these can be covered by only 7 prism wedge base curves since some of them are reversible, as indicated above. With only 7 base curve prism wedges in 20 values of prism power each, only 140 prism wedges are needed in inventory in order to relocate the optical centers to almost any extreme decentration ever required to fit fashionable frames.

The number of near-vision, or bifocal, buttons similarly is a relatively small number, but will depend on the types of bifocals which the dispenser chooses to carry. Twenty power values for each base curve would be provided, but because not all of the bifocal buttons are reversible for use on both positive and negative power lenses, more than the 140 prism wedge units are needed. With 12 base curves for the stock lenses and 20 powers, no more than 240 bifocal buttons would be needed for each bifocal style. A normal inventory of 28 mm flat-top buttons; executive style bifocal segments, 28 mm flat-top trifocal segments, and executive trifocal segments would require only 1200 pieces of multifocal add-on segments, or buttons.

Thus, an inventory of 3020 single vision stock lenses, 140 prism wedges, and 1200 multifocal buttons, or 4320 modular components, could produce:

(a) virtually all single vision compound lenses (45% of optical prescriptions)

(b) virtually all of the flat top bifocal needs (25% of optical prescriptions)

(c) virtually all round, executive, flat top trifocal and executive trifocal needs (about 20% of optical prescriptions).

Since many of the remaining optical needs could also be met by slight modifications to one of the foregoing types, it is seen that the vast majority of optical needs can be met by a small inventory of lens components to which can be assembled and fitted at the dispensing location while the patient waits. Examples of such lens versitilities would be freedon to produce many new lens combinations such as Executive-flat top- trifocal, double flat top occupational trifocals and countless other combinations It must be emphasized that all of these capabilities and flexibilities may be accomplished at the dispensing location without the need of, nor the massive cost of, a large manufacturing plant as is required by the prior arts.

Although the present invention has been described in terms of preferred embodiments, it will be apparent that numerous variations and modifications can be made without departing from the true spirit and scope thereof, as defined in the following claims.

What is claimed is:

1. The method of manufacturing a modular lens for eyeglasses, comprising:

determining the prescription required for the finished modular lens;

measuring the pupillary distance of the patient who will wear the eyeglasses;

selecting a preground, prefinished, single vision lens having the spherical and cylindrical power required by said prescription and having an optical major reference point;

determining the decentration required to fit the selected single vision lens to the patient;

selecting a prism wedge lens having the prism power required to produce the required decentration of said major reference point of said single vision lens; and assembling said single vision lens and said prism wedge lens to produce a surface finished modular lens having the required decentration.

2. The method of claim 1, wherein the step of assembling said single vision and prism wedge lenses includes aligning said prism wedge lens with respect to the cylinder axis of said single vision lens.

3. The method of claim 1, wherein the step of assembling said single vision and prism wedge lenses includes the steps of applying adhesive to one of said lenses;

aligning and angularly orienting said lenses with respect to each other; and curing said adhesive to bond said prism wedge lens to said single vision lens.

4. The method of claim 1, further including:

selecting a frame having an opening for receiving said modular lens;

wherein the step of selecting a single vision lens includes selecting the smallest diameter single vision lens that will cut out the size and shape of said frame opening before decentration.

5. The method of claim 1, further including;

selecting at least one near-vision segment as required by said prescription; and assembling said segment to said prism wedge lens by aligning said segment with respect to said decentered major reference point and adhesively securing said segment to said prism wedge lens to form a multifocal lens.

6. The method of claim 1, further including edge grinding said finished modular lens to fit a selected eyeglass frame.

7. The method of claim 3, further including:

selecting a frame having an opening for receiving said modular lens;

the step of selecting a single vision lens including determining the smallest diameter single vision lens having the power required by said prescription that will cut out to the size and shape of said frame opening before decentration of said lens; and edge grinding said modular lens to fit said frame opening.

8. The method of manufacturing a modular lens for eyeglasses comprising:

selecting from a stock of preground, prefinished single vision lenses having various diameters and various spherical and cylindrical powers, the single vision lens having the power required for the prescription to be filled and having (the smallest diameter that will fill the frame opening in which the lens is to be mounted;

rotating the selected stock lens to orient the cylinder angle as required by the prescription to be filled;:

selecting from a stock of prefinished prism wedges having different prism powers, the prism wedge required to decenter said single vision lens by the amount required for the frame in which the lens is to be mounted; and assembling said single vision lens and said prism wedge lens to produce a surface finished modular lens having the required prescription and decentration.

9. The method of claim 8, further including edge grinding said assembled modular lens to fit the frame opening in which the lens is to be mounted.

10. The method of claim 9, further including securing on said modular lens a near-vision segment.

11. The method of manufacturing a prescription modular lens for eyeglasses, comprising:

providing a multiplicity of preground, prefinished single vision stock lenses each having a different known spherical and cylindrical powers and different known diameters;

providing a multiplicity of prism wedge lenses having different known prism powers;

determining for each of said single vision stock lenses the decentration of its optical major reference point that will be produced by each of said prism wedge lenses, whereby one of said prism wedge lenses can be selected for combination with any selected single vision stock lens to produce a desired decentration for the stock lens;

determining the prescription required by a patient for a finished modular lens;

measuring the pupillary distance of the patient who will wear the eyeglasses containing the finished modular lens;

determining the decentration required to fit the modular lens to the patient;

selecting from said multiplicity of single vision stock lenses the lens having the spherical and cylindrical power required by said prescription;

selecting from said multiplicity of prism wedge lenses the lens having the prism power required to produce the required decentration of the major reference point of the selected single vision stock lens; and assembling said selected single vision stock lens and said selected prism wedge lens to produce a surface finished modular lens having the required decentration.

12. The method of claim 11, wherein data concerning said stock lenses, and said prism wedge lenses, and the decentration provided by each combination thereof, is stored in a computer memory for access for use in selecting the lenses required for assembling a modular lens having a determined prescription and decentration.

13. The method of claim 12, wherein the step of assembling a selected single vision stock lens and a selected prism wedge lens includes;

aligning and angularly orienting said lenses with respect to each other to produce the required decentration of the optical major reference point of said single vision stock lens; and bonding said prism wedge lens to said single vision stock lens.

14. The method of claim 12, further including:

selecting a frame having an opening for receiving said modular lens;

wherein the step of selecting a single vision stock lens includes determining and selecting the smallest diameter single vision stock lens that will cut out to the size and shape of said frame opening before decentration.

15. The method of claim 12, further including:

storing, in a computer memory, data concerning the size and shape of the lens openings for a multiplicity of eyeglass frame styles and sizes;

selecting a frame style and size for receiving said assembled modular lens;

producing from said stored frame data a frame pattern; and edge grinding said modular lens, following said frame pattern.

16. A modular optical manufacturing system for producing from modular lens components finished prescription eyeglass lenses, comprising:
   data terminal means at a first location for receiving information concerning the prescription of eyeglasses to be manufactured for a patient, the size, style and manufacturer of the eyeglass frames selected by the patient, and the pupillary distance between the pupils of the patient's eyes;
   computer means at a second location remote from said first location, said computer including:
   a. first storage means for receiving and storing frame pattern shape data for a plurality of frames;
   b. second storage means for receiving and storing modular lens data for use in producing finished lenses from single vision elements and prism wedge elements, the finished lenses having said prescription and each having a major reference point which coincides with the location of a patient's pupils;
   said computer responding to information from said data terminal to provide at said first location frame pattern data for the patient selected frame, and modular lens data corresponding to the prescription and the pupillary distance information;
   pattern cutter means at said first location responsive to said frame pattern data for producing a frame pattern having a size and shape equal to the lens openings of said patient selected frame;
   modular lens assembler means at said first location for assembling a surface finished prescription lens from the single vision element and the prism wedge element specified by the modular lens data provided by said computer means; and
   means for edge grinding said modular lens to the shape of said frame pattern, whereby said modular lens is adapted to fit in said patient selected frame.

* * * * *